United States Patent
Soles

(10) Patent No.: US 9,969,229 B2
(45) Date of Patent: May 15, 2018

(54) VARIABLE RATE AUXILIARY LEAF ENGAGEMENT

(71) Applicant: GM GLOBAL TECHNOLOGY OPERATIONS LLC, Detroit, MI (US)

(72) Inventor: Peter J. Soles, Tecumseh (CA)

(73) Assignee: GM Global Technology Operations LLC, Detroit, MI (US)

( * ) Notice: Subject to any disclaimer, the term of this patent is extended or adjusted under 35 U.S.C. 154(b) by 217 days.

(21) Appl. No.: 15/136,101

(22) Filed: Apr. 22, 2016

(65) Prior Publication Data

US 2017/0305225 A1   Oct. 26, 2017

(51) Int. Cl.
  *B60G 11/04*    (2006.01)
  *B60G 11/10*    (2006.01)
  B60G 11/36    (2006.01)

(52) U.S. Cl.
  CPC .............. *B60G 11/10* (2013.01); *B60G 11/04* (2013.01); *B60G 11/36* (2013.01); *B60G 2202/112* (2013.01); *B60G 2204/121* (2013.01)

(58) Field of Classification Search
  CPC ......... B60G 11/10; B60G 11/04; B60G 11/36; B60G 2204/121; B60G 2202/112
  See application file for complete search history.

(56) References Cited

U.S. PATENT DOCUMENTS

| | | | | |
|---|---|---|---|---|
| 2,264,174 A | * | 11/1941 | Crump ................... | B60G 11/04 267/66 |
| 3,137,488 A | * | 6/1964 | Toyer ...................... | B60G 7/04 267/269 |
| 3,231,258 A | * | 1/1966 | Brownyer .............. | B60G 9/003 267/31 |
| 3,782,754 A | * | 1/1974 | Sleichter ................ | B60G 11/04 267/271 |
| 3,920,264 A | * | 11/1975 | Lafferty ............... | B60G 11/107 267/262 |
| 4,383,703 A | * | 5/1983 | Honda .................... | B60G 5/047 280/682 |
| 4,886,292 A | * | 12/1989 | Azamatov .............. | B60G 5/053 280/124.174 |
| 4,988,080 A | * | 1/1991 | Shah ........................ | B60G 7/04 267/30 |

(Continued)

FOREIGN PATENT DOCUMENTS

| | | | | |
|---|---|---|---|---|
| GB | 915402 A | * | 1/1963 | ........... B60G 11/107 |
| JP | 59063209 A | * | 9/1982 | ............. B60G 11/02 |
| WO | WO-03106201 A1 | * | 12/2003 | ............. B60G 11/12 |

*Primary Examiner* — Karen Beck
(74) *Attorney, Agent, or Firm* — Quinn IP Law

(57) ABSTRACT

A suspension system allows travel of a sprung mass relative to an unsprung mass. A primary stage has a primary leaf attached between the sprung mass and the unsprung mass. An auxiliary stage has an auxiliary leaf operatively attached to either the primary stage or unsprung mass. A variable engagement bracket includes a mount point, attached to the sprung mass and defining an axis, and an offset arm extending from the mount point and rotatable about the axis. The offset arm contacts the auxiliary stage at a first point at a first travel of the suspension system and at a second point at a second travel. The first point provides or defines a maximum contact span and the second provides a minimum contact span, smaller than the maximum contact span, for the auxiliary stage.

10 Claims, 2 Drawing Sheets

(56) References Cited

U.S. PATENT DOCUMENTS

| | | | |
|---|---|---|---|
| 5,123,672 A * | 6/1992 | Walton | B60G 11/04 |
| | | | 267/263 |
| 5,217,248 A * | 6/1993 | Reast | B60G 5/047 |
| | | | 280/124.106 |
| 5,730,427 A * | 3/1998 | Hower, Jr. | B60G 11/04 |
| | | | 267/36.1 |
| 6,361,026 B2 * | 3/2002 | Reast | B60G 11/12 |
| | | | 267/47 |
| 7,581,741 B2 * | 9/2009 | Reineck | B60G 9/003 |
| | | | 267/263 |
| 7,712,754 B2 * | 5/2010 | Penzotti | B60G 11/12 |
| | | | 267/260 |
| 2011/0057409 A1 * | 3/2011 | Leeder | B60G 11/04 |
| | | | 280/124.175 |
| 2012/0193887 A1 * | 8/2012 | Muck | B60G 11/04 |
| | | | 280/124.163 |
| 2012/0211963 A1 * | 8/2012 | Muck | B60G 11/04 |
| | | | 280/124.174 |
| 2014/0159349 A1 * | 6/2014 | Araujo | B60G 11/10 |
| | | | 280/676 |
| 2015/0145187 A1 * | 5/2015 | Soles | B60G 11/42 |
| | | | 267/30 |
| 2017/0197482 A9 * | 7/2017 | Juriga | B60G 11/10 |
| 2017/0313149 A1 * | 11/2017 | Chihara | B60G 11/04 |

* cited by examiner

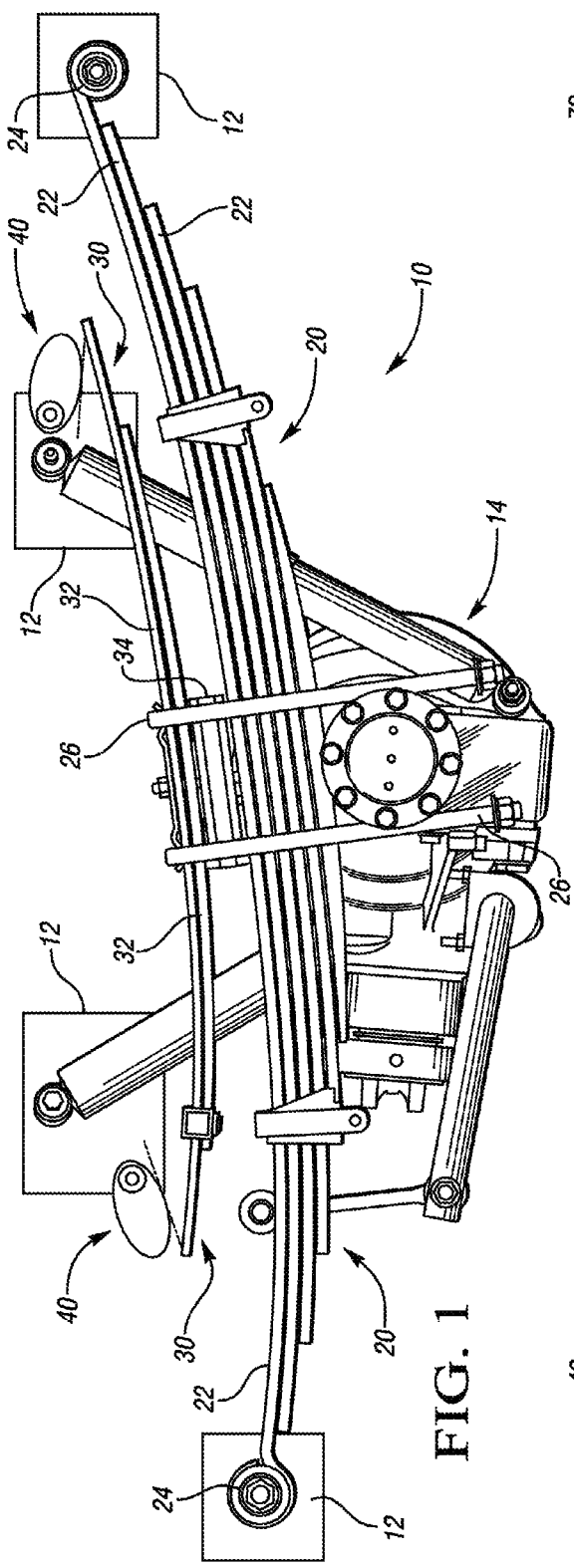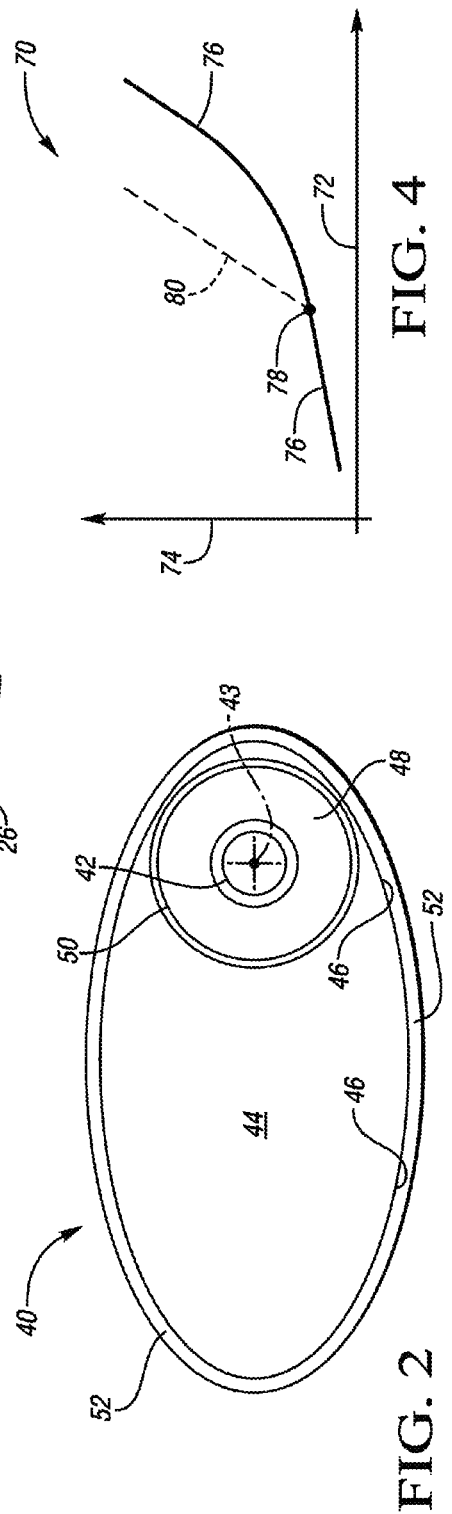

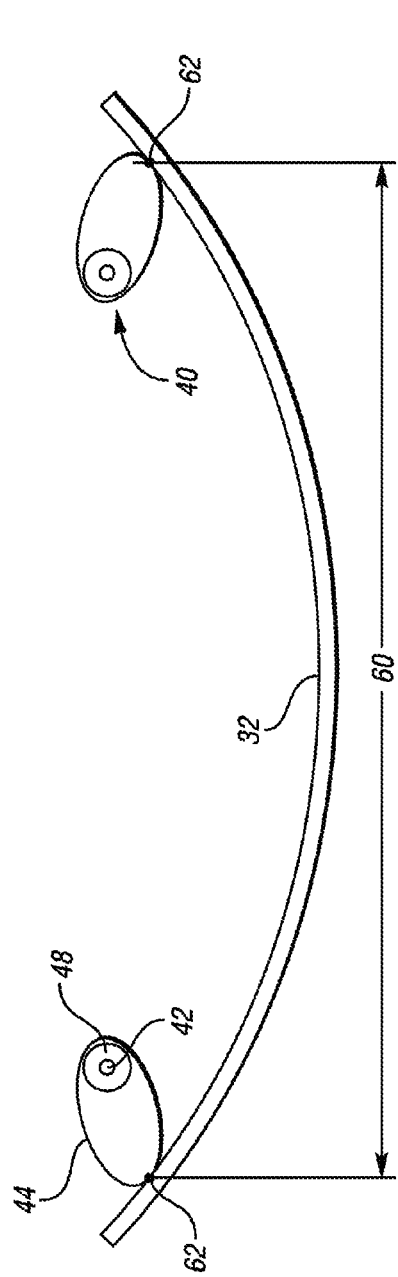
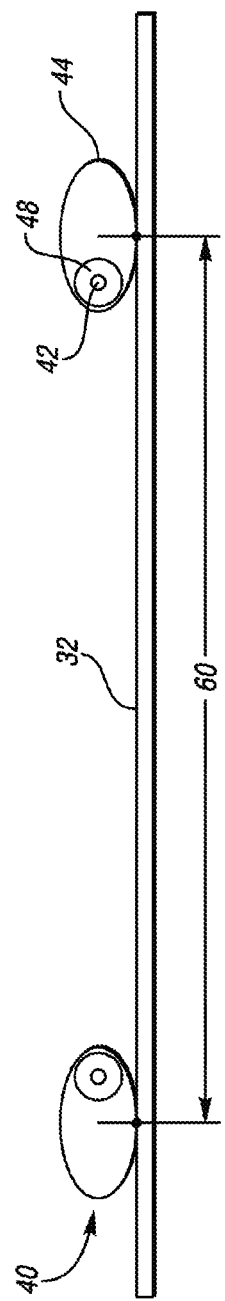
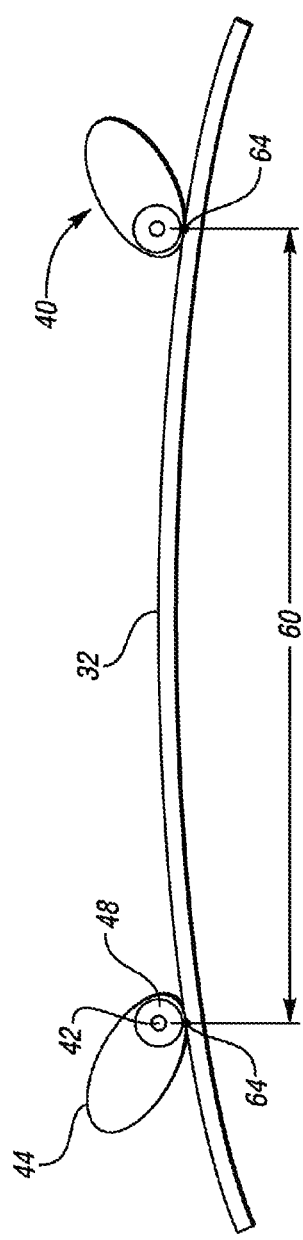
FIG. 3A
FIG. 3B
FIG. 3C

VARIABLE RATE AUXILIARY LEAF ENGAGEMENT

TECHNICAL FIELD

This disclosure generally relates to suspension systems.

BACKGROUND

Leaf springs and leaf spring assemblies, sometimes referred to as Hotchkiss suspensions, refer to beams or laminations of beams used as springs. An axle, or other unsprung component, is suspended relative to the leaf spring. The bending of the leaves provides a cushioning or spring effect.

SUMMARY

A leaf spring suspension system is provided. The suspension system allows travel of a sprung mass relative to an unsprung mass. The suspension system includes a primary stage and an auxiliary stage.

The primary stage has at least one primary leaf attached between the sprung mass and the unsprung mass. The auxiliary stage has at least one auxiliary leaf operatively attached to one of the primary stage and the unsprung mass.

The suspension system includes one or more variable engagement brackets, each of which includes a mount point and an offset arm. The mount point is attached to the sprung mass and defines an axis, and the offset arm extends from the mount point and is rotatable about the axis.

The offset arm of the variable engagement bracket contacts the auxiliary stage at a first point in response to a first travel of the suspension system. The first point provides or defines a maximum contact span for the auxiliary stage. The offset arm of the variable engagement bracket also contacts the auxiliary stage at a second point on the offset arm in response to a second travel of the suspension system. The second point provides or defines a minimum contact span, which is smaller than the maximum contact span, for the auxiliary stage.

The above features and advantages, and other features and advantages, of the present subject matter are readily apparent from the following detailed description of some of the best modes and other embodiments for carrying out the disclosed structures, methods, or both.

BRIEF DESCRIPTION OF THE DRAWINGS

FIG. 1 is a schematic, side view of a leaf spring suspension system having a primary stage and an auxiliary stage.

FIG. 2 is a schematic, side view of a variable engagement bracket for the suspension system shown in FIG. 1.

FIG. 3A is a schematic, illustrative view of interaction between an auxiliary leaf and the variable engagement brackets at a first travel of the suspension system.

FIG. 3B is a schematic, illustrative view of interaction between the auxiliary leaf and the variable engagement brackets at a second travel of the suspension system.

FIG. 3C is a schematic, illustrative view of interaction between the auxiliary leaf and the variable engagement brackets at a third travel of the suspension system.

FIG. 4 is schematic chart illustrated load versus deflection of the suspension system of FIG. 1.

DETAILED DESCRIPTION

Referring to the drawings, like reference numbers correspond to like or similar components whenever possible throughout the several figures. There is shown in FIG. 1 a side view of a suspension assembly or suspension system 10. More specifically, FIG. 1 shows a multi-stage, leaf spring suspension system 10.

The leaf spring suspension system 10 provides travel between a sprung mass 12 and an unsprung mass. In FIG. 1, the sprung mass 12 is illustrated schematically and may be a frame or chassis for a vehicle (not shown). The sprung mass 12 moves relative to the unsprung mass 14, which is illustrated as an axle assembly, but may be structures.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The suspension system 10 may be usable with numerous types of vehicles, including planes, trains, and automobiles. Additionally, heavy industrial, construction, and mining equipment may incorporate the suspension system 10. Furthermore, manufacturing fixtures or tooling—including forging, stamping, or die presses—may also utilize the suspension system 10 to provide relative movement between components or portions.

As illustrated in FIG. 1, the suspension system 10 includes a primary stage 20 having at least one primary leaf 22 attached between the sprung mass 12 and the unsprung mass 14. In the configuration shown, one or more eyelets 24 connect the primary stage 20 to the sprung mass 12 and one or more U-brackets 26 connect the primary stage 20 to the unsprung mass 14. Note, however, that the specific connections of the suspension system 10 shown in the figures are not required.

The suspension system 10 also includes an auxiliary stage 30 having at least one auxiliary leaf 32. The auxiliary stage 30 is operatively attached to either the primary stage 20 or the unsprung mass 14. In the configuration shown, the auxiliary stage 30 is attached to the center of the primary stage 20 through a spacer 34. However, the auxiliary stage 30 may also be directly attached to the unsprung mass 14.

The suspension system 10 allows relative movement (i.e., travel) between the sprung mass 12 and the unsprung mass 14 by flexing the primary stage 20 and, possibly, the auxiliary stage 30. Travel is movement of the sprung mass 12 relative to the unsprung mass 14, and may be measured from the road surface, or from points on the sprung mass 12 and the unsprung mass 14. The spacer 34 separates the auxiliary leaves 32 from the primary leaves 22, such that the auxiliary stage 30 is engaged separately, or at least differently, from the primary stage 20.

The connections of the primary stage 20 and the auxiliary stage 30 are illustrative only. In other configurations, one or both of the connections may be reversed, such that, for example, the eyelets 24 are attached to the unsprung mass 14 and the centrally-located U-brackets 26 are attached to the sprung mass 12, while still providing travel between the sprung mass 12 and the unsprung mass 14.

The suspension system 10 is illustrated with only two stages, the primary stage 20 and the auxiliary stage 30. However, additional stages—such as a third stage that acts on the primary stage 20 after a prescribed amount of travel—may be incorporated without altering the function described herein. If the suspension system 10 includes a third stage, it would also not engage, at least initially, with the primary stage 20.

The suspension system 10 shown includes one or more variable engagement brackets 40. In the configuration shown there are two variable engagement brackets 40, which may be referred to, interchangeably, as a first and second variable engagement brackets 40. In alternative configurations, the suspension system 10 may include only one variable engagement bracket 40, which may cooperate with a fixed bracket or fixed contact point. The variable engagement brackets 40 progressively contact the auxiliary stage 30 to provide additional spring force for the suspension system 10, as described herein.

Referring also to FIG. 2, and with continued reference to FIG. 1, there is shown a more detailed view of the one of the variable engagement brackets 40 of the suspension system 10. The variable engagement brackets 40, include a mount point 42 attached to the sprung mass 12 and defining an axis 43, and an offset arm 44 extending from the mount point 42.

The offset arm 44 is rotatable about the axis 43. In the configuration shown, the offset arm 44 is shaped as an oblong cam lobe or cam profile. However, alternative arm shapes may be used and the offset arm 44 may be a curved cantilevered projection that flexes, instead of rotates, relative to the mount point 42.

The offset arm 44 forms or defines a contact surface 46 about its periphery. The contact surface 46 variably interacts with the auxiliary stage 30 as the suspension system 10 undergoes travel.

In the suspension system 10, wherein the variable engagement brackets 40 further include a torsion bushing 48 disposed between the mount point 42 and the offset arm 44. Therefore, rotation of the offset arm 44 about the axis 43 occurs through the torsion bushing 48. As the offset arm 44 rotates about the mount point 42, the torsion bushing 48 winds up or twists, such that the torsion bushing 48 reacts against rotation and acts as a biasing member.

In the configuration shown in FIG. 2, a bushing can 50 surrounds the torsion bushing 48 and mates to the offset arm 44, such as through a splined connection (not shown). The torsion bushing 48 provides relative rotation between the bushing can 50 and the mount point 42, which is illustrated as a bushing inner metal that may be directly fixed or splined to the sprung mass 12.

In alternative configurations, the mount point 42 and the offset arm 44 may be joined via, for example and without limitation, a torsion spring or other rotational biasing member. Furthermore, the variable engagement brackets 40 may rotate freely about the mount point 42, but include an offset spring load that resists rotation of the offset arm 44 relative to the mount point 42.

In the suspension system 10 illustrated, the variable engagement brackets 40 also include a rubber coating 52 at the contact surface 46 of the offset arm 44. The rubber coating 52 cushions the interface between the contact surface 46 and the auxiliary stage 30, which may reduce wear of the auxiliary stage 30, the engagement bracket 40, or both.

Referring also to FIG. 3A, FIG. 3B, and FIG. 3C, there are shown illustrative views of the interaction between the auxiliary stage 30 and the variable engagement brackets 40 as the suspension system 10 experiences progressive amounts of travel between the sprung mass 12 and the unsprung mass 14. Note that travel of the suspension system 10 refers to relative movement between the sprung mass 12 and the unsprung mass 14. Under actual operating conditions, travel may occur via movement of the sprung mass 12, the unsprung mass 14, or both.

FIG. 3A shows the auxiliary leaf 32 subject to a first amount of travel, such as may be experienced when the suspension system 10 is loaded at its curb weight. Note that the loading state illustrated in FIG. 1 shows suspension system 10 with less travel than that of FIG. 3A, such that the variable engagement brackets 40 are not yet contacting the auxiliary stage 30.

FIG. 3B shows the auxiliary leaf 32 subject to a second amount of travel, greater than that shown in FIG. 3A, such as may be experienced when the suspension system 10 is loaded at its gross axle weight rating. FIG. 3C shows the auxiliary leaf 32 subject to a third amount of travel, greater than that shown in FIGS. 3A and 3B, such as may be experienced when the suspension system 10 is experiencing full jounce.

FIGS. 3A-3C show only a portion of the suspension system 10 and only one auxiliary leaf 32, but are representative of the remainder of the system. When the auxiliary stage 30 contacts the variable engagement brackets 40, the interaction creates an additional spring force between the auxiliary stage 30 and the variable engagement brackets 40. The spring rate introduced by the auxiliary stage 30 varies based on a contact span 60, which is illustrated in FIGS. 3A, 3B, and 3C.

The offset arm 44 of the variable engagement bracket 40 contacts the auxiliary stage 30 at a first point or maximum point 62 in response to a first travel of the suspension system 10, as generally illustrated by FIG. 3A. The maximum point 62 provides a maximum length of the contact span 60 for the auxiliary stage 30. FIG. 3A generally illustrates the initial engagement of the auxiliary stage 30, such that during lesser amounts of travel (under lesser loading conditions) only the primary stage 20 is providing spring force to the suspension system 10.

The offset arm 44 of the first variable engagement bracket 40 contacts the auxiliary stage 30 at a second point or minimum point 64 on the offset arm 44 at a second travel of the suspension system 10, as generally illustrated by FIG. 3C. The minimum point 64 provides a minimum length for contact span 60 of the auxiliary stage 30. The contact span 60 is smaller at the minimum, shown in FIG. 3C, than at the maximum, shown in FIG. 3A. Therefore, the suspension system 10 has a higher spring rate when experiencing the amount of travel illustrated in FIG. 3C than when experiencing the (relatively lesser) amount of travel illustrated in FIG. 3A.

FIG. 3B illustrates the suspension system subjected to an intermediate amount of travel shown, relative to the states shown in FIG. 3C and FIG. 3A. Therefore, the contact span 60 shown in FIG. 3B provides an intermediate spring rate that is less than the spring rate illustrated in FIG. 3C and greater than the spring rate illustrated in FIG. 3A.

As travel of the suspension system 10 progresses from the initial contact shown in FIG. 3A to the full jounce shown in FIG. 3C, the torsion bushing 48 resists rotation of the variable engagement bracket 40. By resisting rotation of the offset arm 44 about the mount point 42, the torsion bushing 48 resists progressive reduction of the contact span 60, which resists increasing the spring rate provided by the auxiliary stage 30.

As illustrated by the progression of FIGS. 3A-3C, the variable engagement bracket 40 provides continuous rolling engagement along the contact surface 46, between the maximum contact span 60 and the minimum contact span 60. Therefore, there is continuous progression of the spring rate as travel of the suspension system 10 moves from the first contact point 62 to the second contact point 64. In some configurations, the auxiliary stage 30 may continue to flex after the state shown in FIG. 3C, with further spring force introduced by further flexure of the auxiliary leaves 32, but with little or no further reduction in the contact span 60.

In the configuration shown in the figures, the first and second variable engagement brackets 40 are substantially identical. However, in other configurations, the variable engagement brackets 40 may have, for example and without limitation, different length offset arms 44 or different torsion bushings 48 to change the interaction between respective variable engagement brackets 40 and the auxiliary stage 30.

Referring also to FIG. 4, there is shown a loading graph 70 that may be illustrative of the load versus displacement characteristics of the suspension system 10 shown in the other figures. The loading graph 70 illustrates travel or deflection along an x-axis 72, and spring load along a y-axis 74. The travel may be measured in millimeters (mm) and the spring load may be measured in newtons (N).

A variable engagement curve 76 illustrates the spring load applied by the suspension system 10 illustrated in the figures as it experiences travel. The variable engagement curve 76 may, therefore, be expressed in newtons/millimeter (N/mm). As illustrated by FIG. 4, as the suspension system 10 is loaded, the primary stage 20 initially provides a linear spring rate, which is the rate of change of load with deflection.

As the suspension system 10 travels sufficiently to cause engagement of the auxiliary stage 30, the interaction between the variable engagement brackets 40 and the auxiliary stage 30 causes the spring rate to begin increasing, as illustrated by an auxiliary point 78 on the loading graph 70. Before the auxiliary point 78, the variable engagement curve 76 is linear. Beyond the auxiliary point 78, the spring rate increases, such that the variable engagement curve 76 is no longer linear.

A fixed auxiliary curve 80, shown as a dashed line, illustrates the spring rate that would be experienced by the suspension system 10 in configurations where the auxiliary stage 30 engages with fixed brackets located at the mount points 42. In such a configuration, the spring rate immediately increases after the auxiliary point 78, which may be felt by an operator as an abrupt change in ride or suspension feel.

The maximum point 64 illustrated in FIG. 3C acts like a hard point or fixed engagement point, such that further travel of the suspension system 10 occurs at a fixed rate, as if the auxiliary stage 30 simply engaged with fixed brackets located at the mount points 42. At travel beyond that illustrated in FIG. 3C, the spring rate of the variable engagement curve 76 is substantially equivalent to the fixed auxiliary curve 80.

The detailed description and the drawings or figures are supportive and descriptive of the subject matter discussed herein. While some of the best modes and other embodiments for have been described in detail, various alternative designs, configurations, and embodiments exist.

The invention claimed is:

1. A leaf spring suspension system for providing travel of a sprung mass relative to an unsprung mass, comprising:
   a primary stage having at least one primary leaf attached between the sprung mass and the unsprung mass;
   an auxiliary stage having at least one auxiliary leaf operatively attached to one of the primary stage and the unsprung mass;
   a first variable engagement bracket, including a mount point attached to the sprung mass and defining an axis, and an offset arm extending from the mount point and rotatable about the axis;
   wherein the offset arm of the first variable engagement bracket contacts the auxiliary stage at a first point on the offset arm in response to a first travel of the suspension system, providing a maximum contact span for the auxiliary stage; and
   wherein the offset arm of the first variable engagement bracket contacts the auxiliary stage at a second point on the offset arm in response to a second travel of the suspension system, providing a minimum contact span that is smaller than the maximum contact span for the auxiliary stage.

2. The leaf spring suspension system of claim 1, wherein the variable engagement bracket provides continuous rolling engagement between the first point and the second point, such that there is continuous variability between the maximum contact span and the minimum contact span of the auxiliary stage, changing a spring rate provided by the auxiliary stage.

3. The leaf spring suspension system of claim 2, further comprising:
   a second variable engagement bracket, a mount point attached to the sprung mass and defining an axis, and an offset arm extending from the mount point and rotatable about the axis;
   wherein the offset arm of the second variable engagement bracket contacts the auxiliary stage at a first point to further define the maximum contact span for the auxiliary stage, and contacts the auxiliary stage at a second point to further define the minimum contact span for the auxiliary stage.

4. The leaf spring suspension system of claim 3, wherein the first variable engagement bracket and the second variable engagement bracket further include:
   a torsion bushing disposed between the mount point and the offset arm, such that rotation of the offset arm about the axis occurs through the torsion bushing.

5. The leaf spring suspension system of claim 4, wherein the first variable engagement bracket and the second variable engagement bracket further include:
   a rubber coating between the offset arm and the first contact point and between the offset arm and the second contact point, wherein the offset arm has a cam profile.

6. The leaf spring suspension system of claim 1, further comprising:
   a second variable engagement bracket, a mount point attached to the sprung mass and defining an axis, and an offset arm extending from the mount point and rotatable about the axis;
   wherein the offset arm of the second variable engagement bracket contacts the auxiliary stage at a first point to further define the maximum contact span for the auxiliary stage, and contacts the auxiliary stage at a second point to further define the minimum contact span for the auxiliary stage.

7. The leaf spring suspension system of claim 6, wherein the first variable engagement bracket and the second variable engagement bracket further include:

a torsion bushing disposed between the mount point and the offset arm, such that rotation of the offset arm about the axis occurs through the torsion bushing.

8. The leaf spring suspension system of claim 1, wherein the first variable engagement bracket further includes:
   a torsion bushing disposed between the mount point and the offset arm, such that rotation of the offset arm about the axis occurs through the torsion bushing.

9. A leaf spring suspension system for providing travel of a sprung mass relative to an unsprung mass, comprising:
   a primary stage having at least one primary leaf attached between the sprung mass and the unsprung mass;
   an auxiliary stage having at least one auxiliary leaf operatively attached to one of the primary stage and the unsprung mass;
   two variable engagement brackets, each including a mount point attached to the sprung mass and defining an axis, and an offset arm extending from the mount point and rotatable about the axis, and a torsion bushing disposed between the mount point and the offset arm, such that rotation of the offset arm about the axis occurs through the torsion bushing;
   wherein the offset arm of the first variable engagement bracket contacts the auxiliary leaf at a first point on the offset arm in response to a first travel of the suspension system, defining a maximum contact span of the auxiliary leaf; and
   wherein the offset arm of the first variable engagement bracket contacts the auxiliary leaf at a second point on the offset arm in response to a second travel of the suspension system, defining a minimum contact span that is smaller than the maximum contact span of the auxiliary leaf.

10. The leaf spring suspension system of claim 9, wherein the variable engagement brackets provide continuous rolling engagement between the first point and the second point on the offset arm, such that there is continuous variability between the maximum contact span and the minimum contact span of the auxiliary leaf, changing a spring rate provided by the auxiliary leaf.

* * * * *